United States Patent
Tham

(10) Patent No.: US 10,593,086 B2
(45) Date of Patent: Mar. 17, 2020

(54) AUGMENTED REALITY LIGHT BEACON

(71) Applicant: SCHNEIDER ELECTRIC SYSTEMS USA, INC., Foxboro, MA (US)

(72) Inventor: Alyssa Tham, Milford, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 0 days.

(21) Appl. No.: 15/783,137

(22) Filed: Oct. 13, 2017

(65) Prior Publication Data

US 2019/0114816 A1    Apr. 18, 2019

(51) Int. Cl.
G06T 11/60    (2006.01)
G06T 7/00     (2017.01)
G01S 1/70     (2006.01)

(52) U.S. Cl.
CPC ............ *G06T 11/60* (2013.01); *G06T 7/0002* (2013.01); *G01S 1/70* (2013.01)

(58) Field of Classification Search
None
See application file for complete search history.

(56) References Cited

U.S. PATENT DOCUMENTS

| 8,330,611 B1 | 12/2012 | Burton et al. | |
| 2007/0063875 A1* | 3/2007 | Hoffberg | G08G 1/0104 340/995.1 |
| 2007/0276590 A1 | 11/2007 | Leonard et al. | |
| 2010/0289885 A1* | 11/2010 | Lu | H04N 5/2258 348/61 |
| 2011/0318013 A1* | 12/2011 | Primm | G06K 7/1097 398/115 |
| 2012/0244939 A1 | 9/2012 | Braun | |
| 2012/0262365 A1 | 10/2012 | Mallinson | |
| 2013/0134906 A1* | 5/2013 | Picariello | H05B 37/0245 315/312 |
| 2014/0139269 A1 | 5/2014 | Jeong | |
| 2014/0225916 A1 | 8/2014 | Theimer et al. | |
| 2015/0044970 A1* | 2/2015 | Park | H04W 76/10 455/41.2 |
| 2018/0182025 A1* | 6/2018 | Smith | G06Q 30/0643 |
| 2018/0365495 A1* | 12/2018 | Laycock | G06K 9/00671 |

FOREIGN PATENT DOCUMENTS

WO    WO 2015142334 A1    9/2015

OTHER PUBLICATIONS

International Search Report and Written Opinion for International Application No. PCT/US2018/054812 dated Dec. 17, 2018.

* cited by examiner

*Primary Examiner* — Frank S Chen
(74) *Attorney, Agent, or Firm* — Locke Lord LLP

(57) ABSTRACT

A system and method are provided to access real time information from a sensor system in an augmented reality environment. The system and method involve capturing images of an area including a beacon for a sensor system and a pattern outputted by the beacon. The pattern corresponds to information including real time sensor data of one or more conditions monitored by the sensor system in the area. The system and method further involve identifying the pattern from the images captured by the image sensing device; translating the pattern to obtain the sensor data; overlaying the sensor data over the captured images in relations to the beacon or sensor system in the captured images; and displaying the overlaid images with the sensor data on a display device.

24 Claims, 14 Drawing Sheets

AUGMENTED REALITY LIGHT BEACON

FIELD

The present disclosure is related to an augmented reality method and system for accessing and viewing real time data from sensor systems in the field.

BACKGROUND

Industry increasingly depends upon highly automated data acquisition and control systems to ensure that industrial processes are run efficiently, safely and reliably while lowering their overall production costs. Data acquisition begins when a number of sensors measure aspects of an industrial process and periodically report their measurements back to a data collection and control system. Such measurements come in a wide variety of forms. By way of example, the measurements produced by a sensor/recorder include: a temperature, a pressure, a pH, a mass/volume flow of material, a tallied inventory of packages waiting in a shipping line, or a photograph of a room in a factory. Often sophisticated process management and control software examines the incoming data, produces status reports, and, in many cases, responds by sending commands to actuators/controllers that adjust the operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial actions such as move equipment into and out of service as required.

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Multiplying a single sensor/control element by thousands of sensors/control elements (a typical industrial control environment) results in an overwhelming volume of data flowing into the manufacturing information and process control system. Sophisticated data management and process visualization techniques have been developed to handle the large volumes of data generated by such system.

Highly advanced human-machine interface/process visualization systems exist today that are linked to data sources such as the above-described sensors and controllers. Such systems acquire and digest (e.g., filter) the process data described above. The digested process data in-turn drives a graphical display rendered by a human machine interface. Examples of such systems are the well-known Wonderware INTOUCH® human-machine interface (HMI) software system for visualizing and controlling a wide variety of industrial processes and the ArchestrA™ (e.g., the application server or AppServer for INTOUCH™) comprehensive automation and information software open architecture designed to integrate and extend the life of legacy systems by leveraging the latest, open industry standards and software technologies.

At these industrial sites, personnel may also perform local inspections, maintenance or repair of equipment and sensor systems for such equipment in the field. Personnel can access information from a data and control acquisition system regarding the equipment, sensor systems, and their operational status; however, it may be difficult to associate such data with a specific piece of equipment on the site. It may also be difficult for personnel to physically access specific equipment and their sensor systems at the site, and thus, to locally access information from the sensor systems.

SUMMARY

To address these and other issues, a system and method are provided to access real time information from a sensor system in an augmented reality (AR) environment or display. The system and method involve capturing images of an area including a beacon for a sensor system and a pattern outputted by the beacon. The pattern corresponds to information including real time sensor data of one or more conditions monitored by the sensor system in the area. The system and method further involve identifying the pattern from the images captured by the image sensing device; translating the pattern to obtain the sensor data; overlaying the sensor data over the captured images in relations to the beacon or sensor system in the captured images; and displaying the overlaid images with the sensor data on a display device. The system and method can be implemented on a mobile device, such as a smart phone or tablet, through an AR application or app or remotely using a computer via a live camera feed. The sensor data can reflect a sensor measurement taken by a sensor of the sensor system.

The captured images can be a live image feed or live video feed of the area. The pattern can be an infrared pattern outputted by the beacon, or a visible pattern outputted by the beacon.

In a further example, the area captured in the images includes a plurality of beacons each outputting a separate pattern corresponding to information including real time sensor data for a corresponding sensor system in the area. The system and method are configured to identify each of the separate patterns, to translate each of the separate patterns to obtain respective sensor data, to overlay sensor data for each sensor system over the captured images in relations to the corresponding beacon or sensor system in the captured images, and to display via a display device the overlaid images with the sensor data for each of the different sensor systems.

DESCRIPTION OF THE FIGURES

The description of the various example embodiments is explained in conjunction with the appended drawings, as follow.

DISCUSSION OF EXAMPLE EMBODIMENTS

Figure 1:
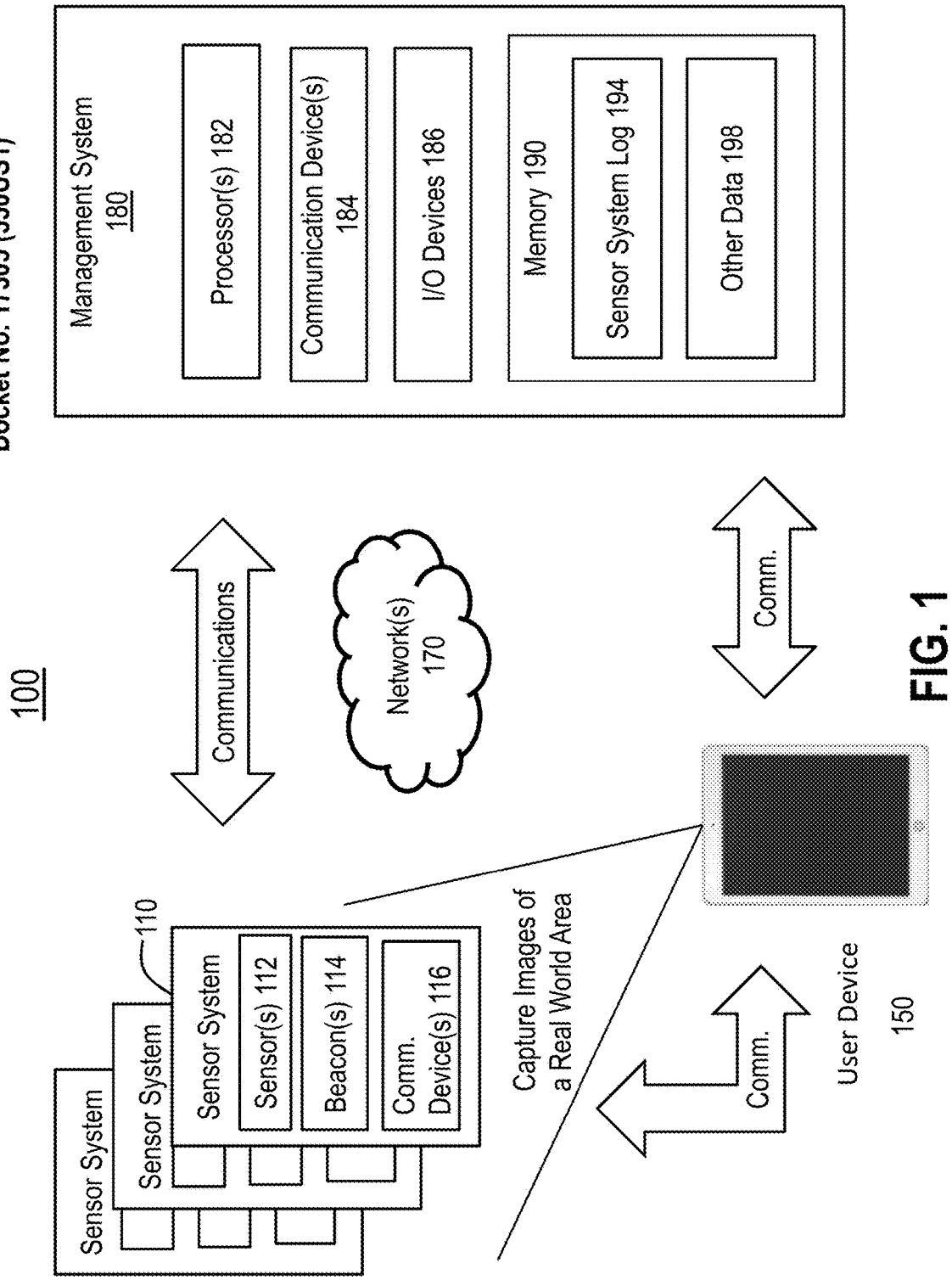
FIG. 1 illustrates a monitoring system with beacons to disseminate or broadcast information, such as from a sensor system, for access and display in an AR environment or display, in accordance with an example embodiment of the present disclosure.

FIG. 1 illustrates a monitoring system 100 to disseminate information, such as from one or more sensor systems 110, for access and display in an augmented reality (AR) environment or display. The monitoring system 100 includes one or more sensor systems 110, a user device(s) 150, a management system 180 and a network(s) 170 for conducting communications between the different systems and devices. In general, the sensor system 110 generates and outputs a pattern, via a beacon 114, corresponding to information including real time sensor data from a sensor(s) 112 of the sensor system 110. The user device 150 captures images, such as a live image feed or live video feed, of an area, which includes the pattern and the sensor system or components thereof translates the pattern; and overlays and displays the real time sensor data in relations to the sensor system or components thereof in the captured images.

In this way, a user, such as a technician or other personnel, can capture images of a real world area to access and view real time sensor data as well as other information in an AR environment or display in relations to one or more corresponding sensor systems or their components in the area. Such an arrangement can be particularly useful where the sensor systems are difficult to physically access and/or are far away, where lighting may be poor (e.g., dim, shadows, etc.) particularly for image recognition, where an integrated display is not working or not installed, and/or where sensor data is inaccessible to the user from the management system 180. Such an arrangement can also be implemented using one-way communication from the sensor system 110 or components thereof to the user device 150, without requiring the user device to contain any additional or dedicated communication equipment. Furthermore, it is also possible to obtain cost savings by eliminating the need for a display device for the sensor system 110 or components thereof (e.g., transmitter). A more detailed description of the various components and operation of the monitoring system 100 will be described below with reference to the figures.

Figure 2:
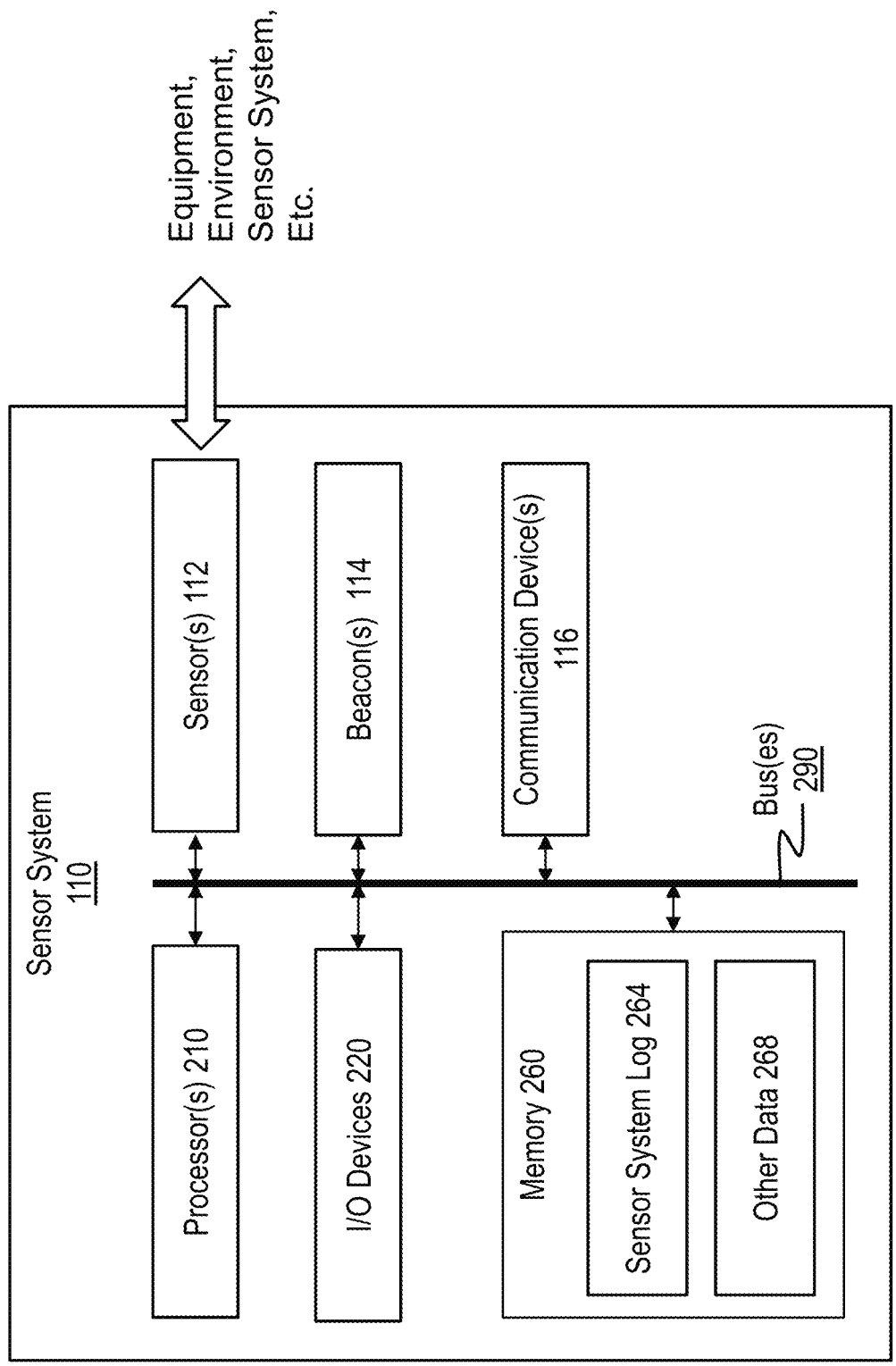
FIG. 2 illustrates a block diagram of components of an example sensor system, in accordance with an example embodiment of the present disclosure.

As shown in FIGS. 1 and 2, the sensor system 110 can include one or more sensors 112, one or more beacon(s) 114, a communication device(s) 116, processor(s) 210, input/output (I/O) devices 220, a memory 260, and a communication infrastructure such as a bus(es) and/or lines 290 to enable communication between the different components. The memory 260 can store information or data including a sensor system log 264, and other data 268. The sensor system log 264 can store present and historical sensor data as well as other sensor system data related to the sensor system 110, monitored equipment, or components thereof. The sensor data can, for example, represent one or more conditions monitored by the sensor 112, such as a sensor measurement, a sensed condition/status (e.g., normal, abnormal, error, no error, etc.) for the monitored equipment, the sensor system or components thereof, and so forth. The other data 268 can also store applications or programs, which when executed by the processor 210, manage and control the operations of the sensor system 110, such as described herein.

The sensor 112 can include a pressure sensor, a flowrate sensor, a vibration sensor, a pH sensor, a conductivity sensor, a current sensor, voltage sensor, temperature sensor, sensor to monitor a condition or status of the sensor system or components thereof and/or other sensing devices for monitoring (e.g., sensing, measuring, etc.) one or more conditions associated with a location, equipment or component thereof, object, and so forth.

The beacon 114 can be an output device which outputs a pattern, which is discernible from images, such as a live image feed or live video feed, captured using an image sensing device, such as a camera or video camera. The beacon 114 can be an infrared beacon (e.g., emitting signals in the infrared spectrum), a light beacon (e.g., emitting signals in the visible light spectrum), a mechanical beacon (e.g., a movable flywheel or other movable object) or other type of beacon which can be controlled to produce a unique pattern, which can be captured by images taken from an image sensing device and which represents information, e.g., sensor system data including real time sensor data monitored by the sensor 112 and other information, if desired.

The unique patterns can be generated or formulated using a combination of unique visible and changeable symbols, of unique visible colors, of unique visible positions of a mechanical object which is movable or has movable parts, of flashes of light (e.g., ON and OFF) in a specific number and period or frequency or combination thereof. The patterns also can, for example, correspond to a code, which can be encoded or decoded, using a known coding system such as Morse code or other coding system depending on the amount of information sought to be transmitted or broadcasted using the beacon 114. Simple patterns can be used to reflect simple information such as a Boolean or YES/NO value, while more complex patterns can be used to reflect more complex information. The sensor system 11 can also use different beacons 114 to convey different types of sensor system data for a sensor system.

In one example, an infrared or visible light beacon can be controlled to flash (e.g., turn ON and then OFF) over a period of time in a desired pattern (or frequency) to reflect the desired information to be transmitted to the user device 150. The beacon 114 can be configured to repeat the pattern periodically, aperiodically, continuously, upon a triggering event (e.g., a command request from the user via the user device 150), and so forth. The pattern can also be updated to reflect real time changes to the sensor data or other data associated with the sensor system 110. An infrared beacon may be particularly desirable since it would be unobtrusive to a passersby, but still be visible to an image sensing device. An infrared beacon is also useful where lighting may be particularly poor for image recognition in the visible range or spectrum.

The communication device(s) 116 can include communication circuitry (e.g., transmitter (TX), receiver (RX), transceiver such as a radio frequency transceiver, network interface device (NID), etc.) for conducting communications across a network(s) with other remote devices or systems, such as the user device 150 or the management system 180. For example, the communication device(s) 116 can conduct line-based communications with a remote device or system, or conduct wireless communications with a remote device or system, such as for example through a wireless personal area network, a wireless local area network, a cellular network or wireless wide area network.

The processor(s) 210 is configured to manage and control the operations of the sensor system 110. The operations can include monitoring of one or more conditions using the sensor 112 to obtain real time sensor data, storing the sensor data and other data (e.g., data associated with the sensor system 110 or equipment monitored by the sensor system, configuration data for the sensor system, etc.) in the memory 260, transmitting the sensor data to the management system 180 via the communication device 116, translating (or converting) data such as the sensor data and/or other data into a pattern; outputting the pattern using the beacon 114, configuring or reconfiguring the sensor system 110 (e.g., setting or changing system parameters and operations), and other operations described herein.

The I/O (Input/Output) devices 220 are input device(s) and output device(s), which can be interconnected to the sensor system 110 via input and output interfaces, respectively. The input devices can include user input devices (e.g., buttons, dials, switches, keyboard, touch display, or other user input devices) to enable a user to manually set, configure or test operations of the sensor system 110. The output devices can include a display, lights (e.g., LEDs), or other output devices to display information related to the sensor system, such as, for example, real time sensor data or other sensor system data.

The memory 260 stores a sensor system log 264 and other data 268. The sensor system log 264 can store present and historical sensor data monitored by the sensor 112 as well as other sensor system data. The other data 268 can also store information, such as for example data associated with the sensor system 110 or equipment monitored by the sensor system, configuration data for the sensor system, etc. The other data 268 can also include data or information, including applications or programs, configuration data, or other pertinent information, to manage and control the operations of the sensor system 110.

As further shown in FIG. 1, the management system 180 can be configured to centrally manage various services and processes including, for example, diagnostics, runtime management (e.g., of automated production processes, etc.), security, alarming, history and other services through a set of applications. The applications together can be part of a control and data acquisition infrastructure over hardware or devices (e.g., programmable logic controllers (PLCs), remote terminal units (RTUs, sensor systems/sensors, etc.) of a facility such as an industrial system(s) or plant(s) (e.g., industrial automation system, automated processing system, etc.). The control and data acquisition infrastructure can be a supervisory control and data acquisition (SCADA)-based infrastructure.

The management system 180 can include a processor(s) 182, communication devices(s) 184, I/O devices 186 and a memory 190. The processor(s) 182 is configured to manage and control the operations of the management system 180, including the acquisition, storage, and update of sensor system data received from the sensor systems 110 and the user device 150. The communication device(s) 184 can include similar components and functionality as other communication device(s) described herein to perform communications with other devices and systems, across the network 170. The I/O devices 186 can include a computer console through which an operator can monitor and manage the various processes under the control and supervision of the management system 180. The memory 190 can include data and information, such as a sensor system log 194 and other data 198. The sensor system log 194 stores present and historical sensor data monitored by the sensors 112 of the sensor systems 110, as well as other sensor system data related to the sensor systems 110, monitored equipment, or components thereof. The other data 198 can include data or information, including applications or programs, configuration data, or other pertinent information, to manage and control the operations of the management system 180.

Figure 3:
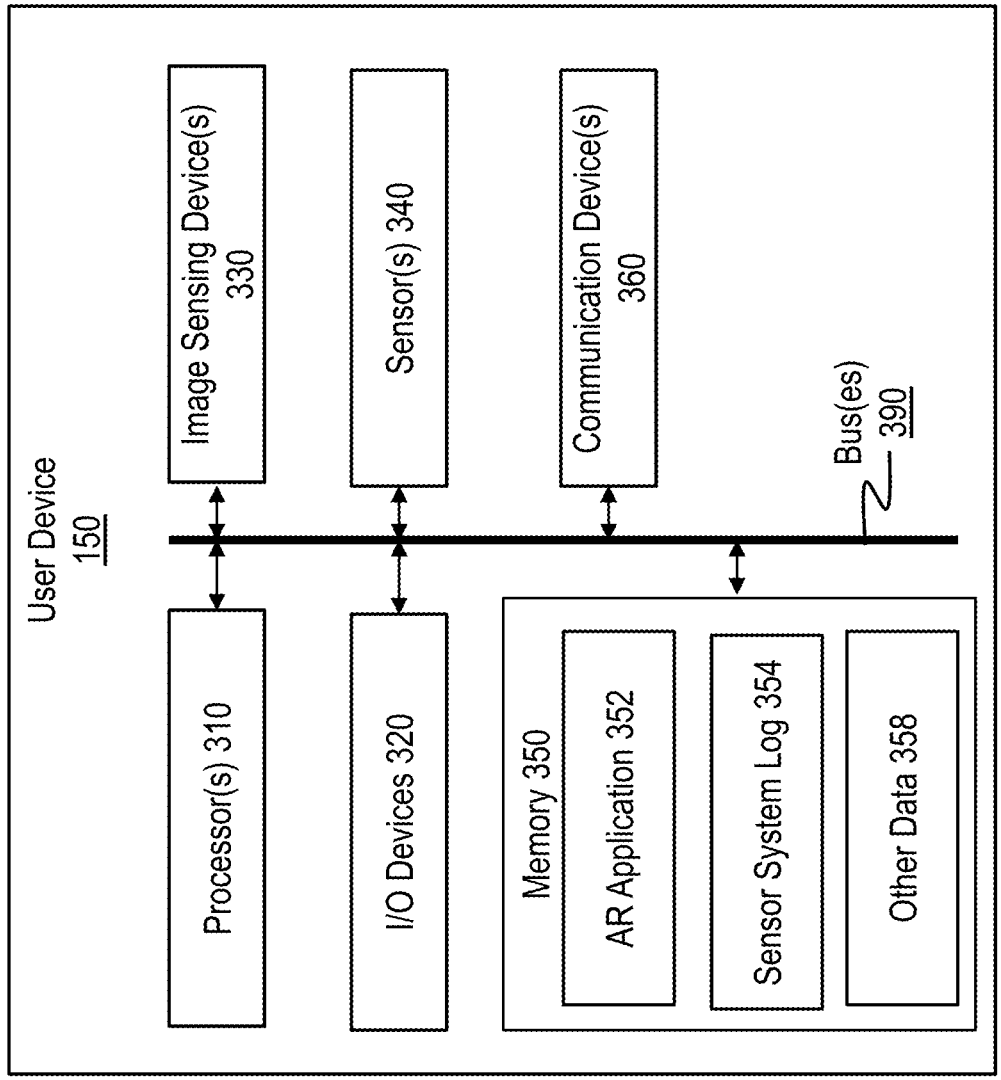
FIG. 3 illustrates a block diagram of components of an example user device, in accordance with an example embodiment of the present disclosure.

FIG. 3 illustrates a block diagram of example components of the user device 150, in accordance with an example embodiment of the present disclosure. The user device 150 includes a processor(s) 310, I/O devices 320, image sensing device(s) 330, memory 350, communication device(s) 360, and communication infrastructure such as a bus(es) and/or lines 390 to enable communication between the different components. The user device 150 can be a mobile or portable device such as a smart phone, tablet, mobile computer, or wearable computing device (e.g., glasses with display and computer functionality such as Google glasses).

The processor 310 is configured to manage and control the operations of the user device 150. The operations can include among other things an AR environment for accessing and viewing real time sensor data and/or other information of a real world area in relations to corresponding sensor systems 110 or their components, such as described herein. For example, the processor 310 is configured to capture images (e.g., live image feed or live video feed), identify, track and translate (or convert) pattern(s) in the captured images; to overlay and display the translated information (e.g., real time sensor data) in relations to the sensor systems 110 or components thereof in the captured images; and to perform other operations and functions described herein.

The I/O (Input/Output) devices 320 are input device(s) and output device(s), which can be interconnected to the sensor system 110 via input and output interfaces, respectively. The input devices can include user input devices (e.g., touch screen such as a capacitive touch screen, buttons, dials, switches, keyboard or other user input devices) to enable a user to control the operations of the user device 150, including the operations related to the AR display operations AR technical feature described herein. The output devices can include a display device (e.g., touch screen), or other output devices (e.g., microphone, etc.).

The image sensing device 330 is configured to capture images, such as a live image feed or video feed. The image sensing device 330 can be a camera such as a video camera, which can capture images in the infrared range and/or visible light range.

The sensor 340 can include additional sensors, such as a position sensor (e.g., GPS) to obtain the position of the user device, an accelerometer, a gyroscope, a compass, a barometer or other sensors. The sensed position and/or other sensed data from the sensor 340 of the user device 150, for example, can also be used to obtain the relative position of the sensor systems 110 and their beacons 112 for the purposes of facilitating the identification of the sensor systems 110 and their components in the captured images. The information on a position of the sensor system 110 or components thereof can be obtained either from the management system 180 or directly from the sensor system 110, via the communication device 116.

The memory 350 stores data or information, including an AR application (or app) 352, sensor system log 354 and other data 358. The AR application 352 can be a computer program, which when executed, implements AR processes described herein to access and display real time sensor data along with other information from the sensor system(s) 110 in an AR environment. The sensor system log 354 can store present and historical sensor data (for the sensor systems) obtained by the user device 150, as well as other sensor system data related to the sensor systems 110, monitored equipment, or components thereof. The other data 358 can also include data or information, including other applications (e.g., operating system, etc.), configuration data, etc., to manage and control the operations of the user device 150.

The communication device(s) 360 can include communication circuitry (e.g., transmitter (TX), receiver (RX), transceiver such as a radio frequency transceiver, network interface device (NID), etc.) for conducting communications across a network(s) with other remote devices or systems, such as the sensor systems 110 and/or management system 180. For example, the communication device(s) 360 can conduct wireless communications with a remote device or system, such as for example through a wireless personal area network, a wireless local area network, a cellular network or wireless wide area network. The communication device(s) 360 can also conduct line-based communications with a remote device or system (e.g., Ethernet, etc.), if desired.

Various example processes and data will be discussed below with reference to FIGS. 4-9. For the purposes of explanation, these figures will be described with reference to the example systems and devices and their components, as described in the example of FIGS. 1-3.

Figure 4:
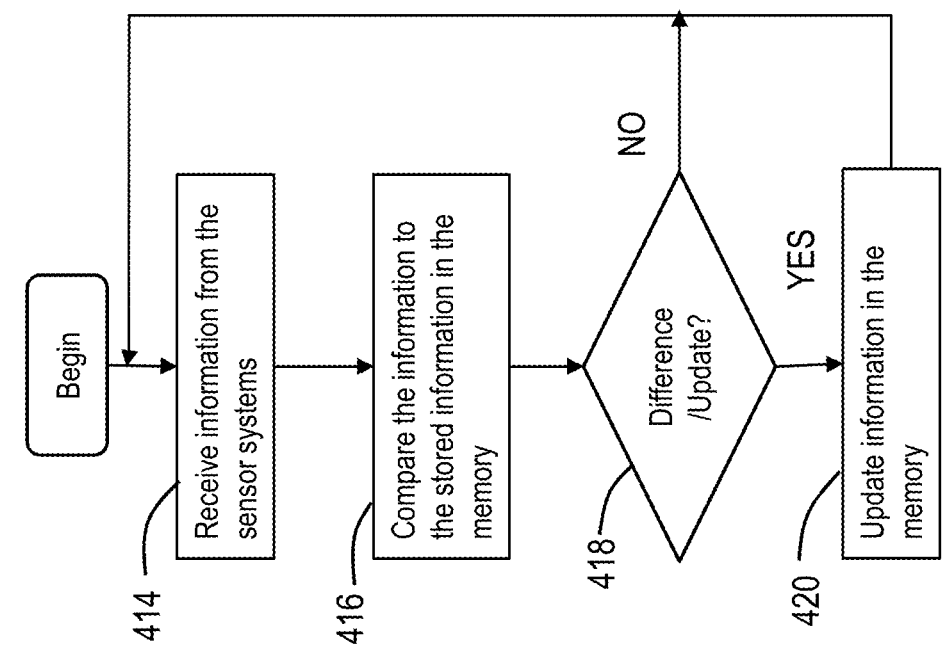
FIG. 4 is a flow diagram showing an example process by which a management system communicates with a sensor system to update and verify information, including sensor system logs, in accordance with an example embodiment of the present disclosure.

FIG. 4 is a flow diagram showing an example process 400 by which a management system (e.g., 180) communicates with a sensor system (e.g., 110) to update and verify information, including sensor system logs, in accordance with an example embodiment of the present disclosure.

At reference, 414, the management system 180 receives information from the sensor systems 110, such as across the network 170. The information can include sensor system data including sensor data and other data, as described herein, from the sensor systems 110.

At reference 416, the management system 180 compares the received information to the information maintained in the memory 190, such as data stored in the sensor system log 194 for the sensor systems 110.

At reference 418, the management system 180 determines whether there is a difference between the received information and the stored information, or whether the stored information needs to be updated in light of the received information. If so, the management system 180 updates the information in the memory 190, such as the sensor system log 194. In this way, the management system 180 can acquire and update data related to the operation of each of the sensor systems and the monitored equipment or location, and thus, manage and control the operations of the sensor systems and equipment accordingly.

Figure 5:
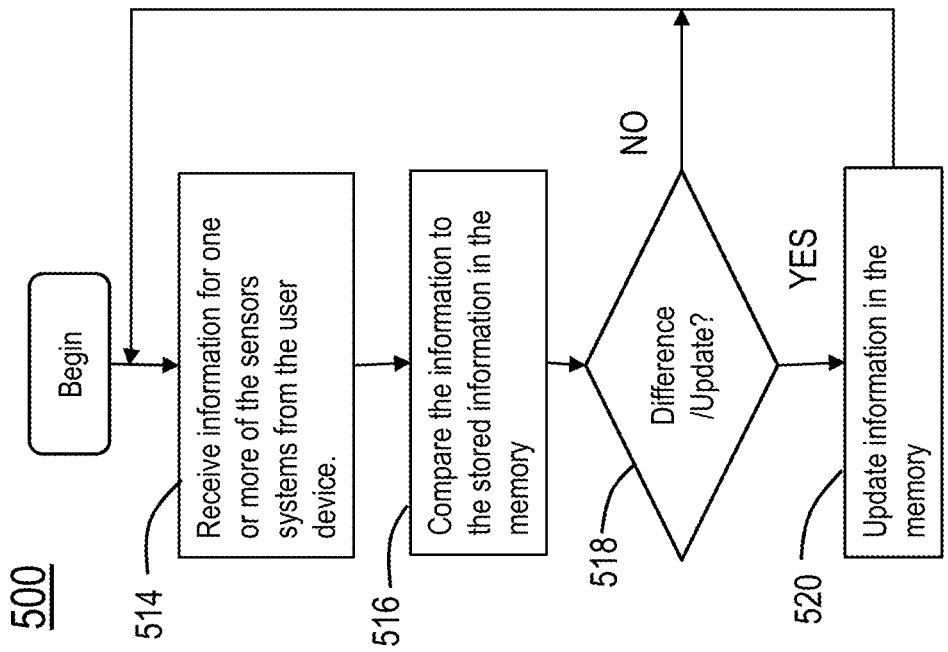
FIG. 5 is a flow diagram showing an example process by which a management system communicates with a device such as a user device to update and verify information, including sensor system logs, in accordance with an example embodiment of the present disclosure.

FIG. 5 is a flow diagram showing an example process 500 by which a management system (e.g., 180) communicates with a device such as a user device (e.g., 150) to update and verify information, including sensor system logs 194, in accordance with an example embodiment of the present disclosure.

At reference, 514, the management system 180 receives information from the user device 150, such as across the network 170. The information can include sensor system data including sensor data and other data, as described herein, obtained from the user device 150.

At reference 516, the management system 180 compares the received information to the information maintained in the memory 190, such as data stored in the sensor system log 194 for the sensor systems 110.

At reference 518, the management system 180 determines whether there is a difference between the received information and the stored information, or whether the stored information needs to be updated in light of the received information. If so, the management system 180 updates the information in the memory 190, such as the sensor system log 194. In this way, the management system 180 can acquire and update data related to the operation of each of the sensor systems and the monitored equipment or location, and thus, manage and control the operations of the sensor systems and equipment accordingly.

Figure 6:
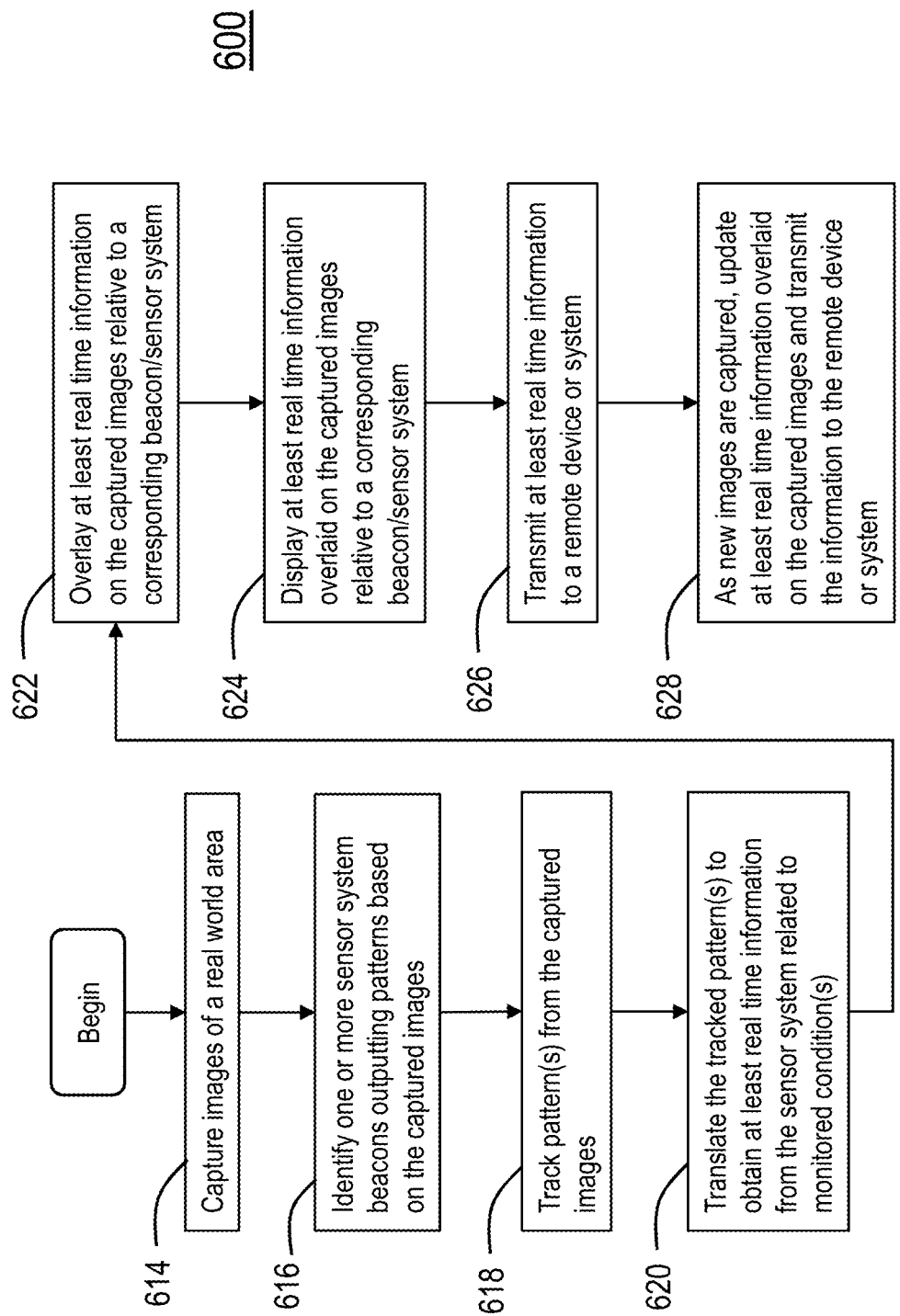
FIG. 6 is a flow diagram showing an example process by which a device, such as a user device, accesses information, including real time sensor data, from a pattern outputted by a beacon of a sensor system for output in an AR environment or display, in accordance with an example embodiment of the present disclosure.

FIG. 6 is a flow diagram showing an example process 600 by which a device, such as a user device (e.g., 150), accesses information, including real time sensor data, from a pattern outputted by a beacon (e.g., 114) of a sensor system (e.g., 110) for display in an AR environment, in accordance with an example embodiment of the present disclosure.

At reference 614, the user device 150 captures images of a real world area using the image sensing device 330. The captured images can be a live image feed or live video feed.

At reference 616, the processor 310 of the user device 150 identifies one or more sensor system beacons 114 which are outputting patterns based on the captured images.

At reference 618, the processor 310 tracks pattern(s) from the captured images for one or more of the sensor systems 110 in the captured images.

At reference 620, the processor 310 translates (or converts) the tracked pattern(s) to obtain information including real time information (e.g., real time sensor data) as well as other sensor system data from the sensor system 110.

At reference 622, the processor 310 overlays at least the real time information (along with the other received information if desired) on the captured images relative to a corresponding sensor system 110 or components thereof (e.g., beacon 114, etc.).

At reference 624, the processor 310 displays the real time information (along with the other received information if desired) overlaid on the captured images relative to a corresponding sensor system 110 or components thereof.

At reference 626, the processor 310 transmits the real time information (along with the other received information if desired) to a remote device or system. For example, the processor 310 can transmit the information to the management system 180 using the communication device 360.

At reference 628, the processor 310 updates the real time information (along with the other received information if desired) overlaid on the captured images, and transmits the information to the management system 180 using the communication device 360.

The process 600 employs image recognition techniques to identify objects and features in the captured images, such as the sensor systems 110 and their components and outputted patterns. Other information such as the position of the user device 150 and the sensor systems 110 (or their components) can also be used to facilitate the identification of objects and features in the captured images.

Furthermore, in another example embodiment in the context of the example of FIG. 6, the beacon can be used to provide information regarding an identity of a sensor (or only sensor identification information such as a sensor identifier (e.g., an identifier code)) through the pattern, which can then be translated and used by the processor 310 to request and obtain further information from a remote management system (e.g., 180 in FIG. 1) regarding the identified sensor. Such information can, for example, include sensor information, which may not be available to the sensor such as a calibration due date for the sensor, and so forth. As in the example of FIG. 6, the processor 310 can then display the real time information (along with the other received information if desired) overlaid on the captured images relative to a corresponding sensor system 110 or components thereof, and update the real time information (along with the other received information if desired) overlaid on the captured images.

Figure 7:
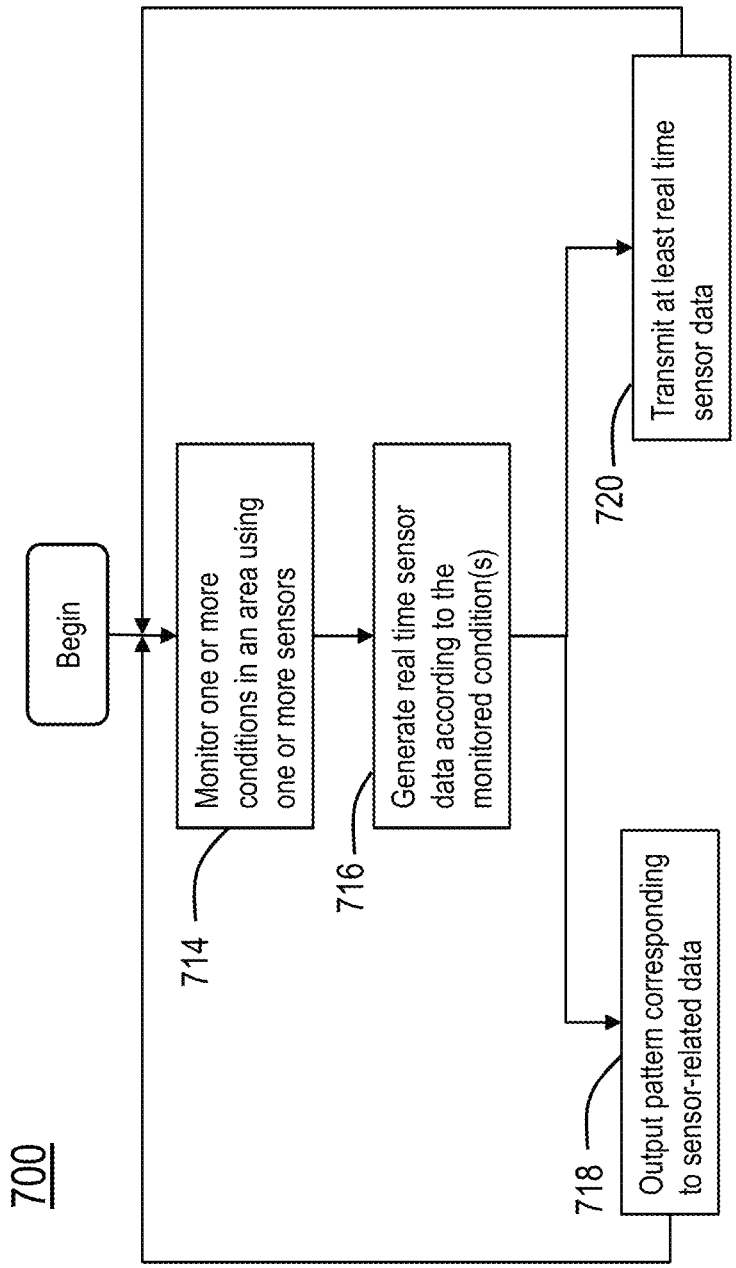
FIG. 7 is a flow diagram showing an example process by which a beacon outputs a pattern, corresponding to information including real time sensor data, which can be monitored using an image sensing device, in accordance with an example embodiment of the present disclosure.

FIG. 7 is a flow diagram showing an example process 700 by which a sensor system (e.g., 110) outputs, via a beacon (e.g., 114), a pattern. The pattern corresponds to information including real time sensor data or other sensor system data, which can be monitored using an image sensing device.

At reference 714, the sensor system 110 monitors one or more conditions in an area using the sensor 112.

At reference 716, the processor 210 of the sensor system 110 obtains real time sensor data corresponding to the one or more monitored conditions and other sensor system data.

At reference 718, the processor 210 outputs, via a beacon 112, a pattern which corresponding to the real time sensor data and, if desired, other data related to the management and operation of the sensor system 110 or the monitored equipment, such as other sensor system data.

At reference 720, the processor 210 transmits, via the communication device 116, the real time sensor data and, if desired, other data related to the management and operation of the sensor system 110 or the monitored equipment, to the management system 180 or other device or systems (e.g., the user device 150), such as other sensor system data.

Figure 8:
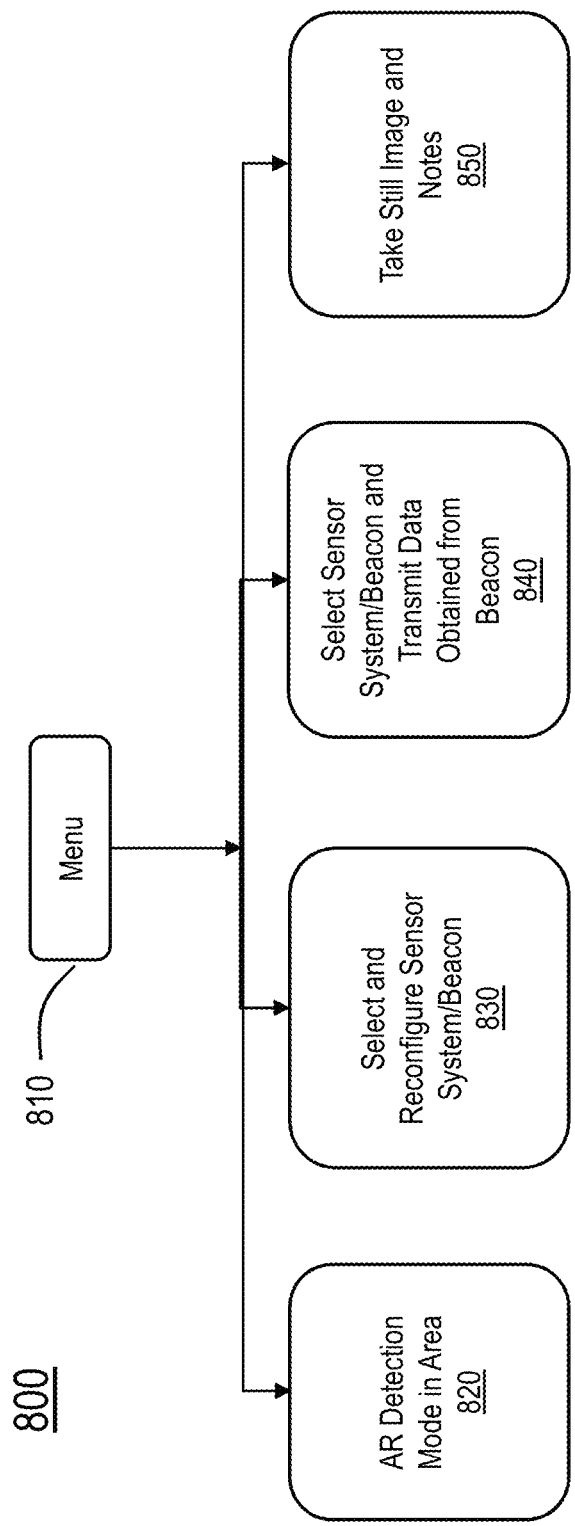
FIG. 8 illustrates a high level diagram of various functions and operations provided through a menu available through a device, such as a user device, in accordance with an example embodiment of the present disclosure.

FIG. 8 illustrates a high level diagram 800 of various functions and operations provided through a menu of options available through a device such as a user device (e.g., 150), in accordance with an example embodiment of the present disclosure. The user can access the menu and its options on the user device 150 using the input devices (e.g., touch screen, etc.). The menu can be a graphical object, pull down box or other graphical element displayed on the display device of the user device 150.

As shown in FIG. 8, the menu can include the following user selectable operations or functions. For example, at reference 820, an AR detection mode 180 is available to initiate an AR environment or display for accessing and displaying real time sensor data and other information relative to corresponding sensor systems 110 or components thereof displayed in the captured images on the user device 150. At reference 830, the user can also select and reconfigure sensor system(s) 110 and their beacon(s) 114, which have been identified and are being displayed on the user device 150. For reconfiguration, two-way communication between the sensor system 110 and the user device 150 can be conducted (e.g., using Bluetooth or other communication medium). At reference 840, the user can select sensor system(s) 110 and their beacon(s) 114 displayed in the captured images, and transmit information received from the selected sensor system 110/beacon 114 to a remote device or system, such as the management system 180. At reference 850, the user can take a still image(s) of the AR display (e.g., a snap shot) with the information overlaid on corresponding sensor system 110 or its beacon 114 on the images (e.g., live image feed or live video feed), as well as can take notes on the user device 150. The still images and notes can be stored in the memory 350 of the user device 150, and transmitted to the management system 180, if desired. The above are a few examples of a menu of user-selectable operations provided on the user device 150.

Figure 9:
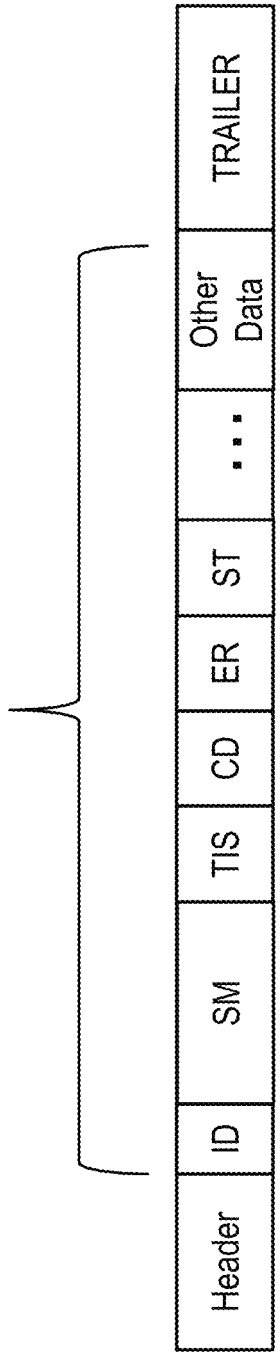
FIG. 9 illustrates an example of a data format of information transmitted using a pattern outputted by a beacon, in accordance with an example embodiment of the present disclosure.

FIG. 9 illustrates an example of a data format 900 of example information, which can be transmitted using a pattern(s) outputted by a beacon(s), in accordance with an example embodiment of the present disclosure. In this example, the data format 900 can include a header and a trailer or the like to define the beginning and end of the data block, respectively, associated with an instance of the pattern, and a payload such as sensor system data, which includes real time sensor data relating to one or more monitored conditions (e.g., measurements, conditions, status, etc.), as well as other information related to the sensor system 110, monitored equipment, or components thereof. For example, the sensor system data can include an ID (Sensor System Identifier), SM (Sensor Measurement), TIS (Time in Service), CD (Calibration Due), ER (Error condition), ST (Status of Sensor System) and other data. ID identifies the sensor system. SM is a sensor measurement taken by a sensor. TIS is a time or length of time that the sensor system has been in service. CD is a time calibration is due or length of time remaining before calibration is due. ER indicates a status of the sensor system, e.g., ERROR or NO ERROR/NONE. ST indicates an operational status of the sensor system, e.g., NORMAL or ABNORMAL.

Other data can include other relevant information related to the sensor system or its components or the equipment being monitored by the sensor system, including other real time sensor data. For example, other data can include characterized sensor measurement digital output, uncharacterized sensor measurement digital output, 4-20 mA Analog Output, measurement range/span, measurement drift (e.g., a warning), overpressure event experienced (warning), power failure event experienced (e.g., a warning), safety event experienced (e.g., warning), transmitter errors (e.g., a warning), configuration, information from programmable logic controller or PLC (e.g., control room), and user-input information (application description, e.g. "Downstream oil pump pressure").

Figure 10:
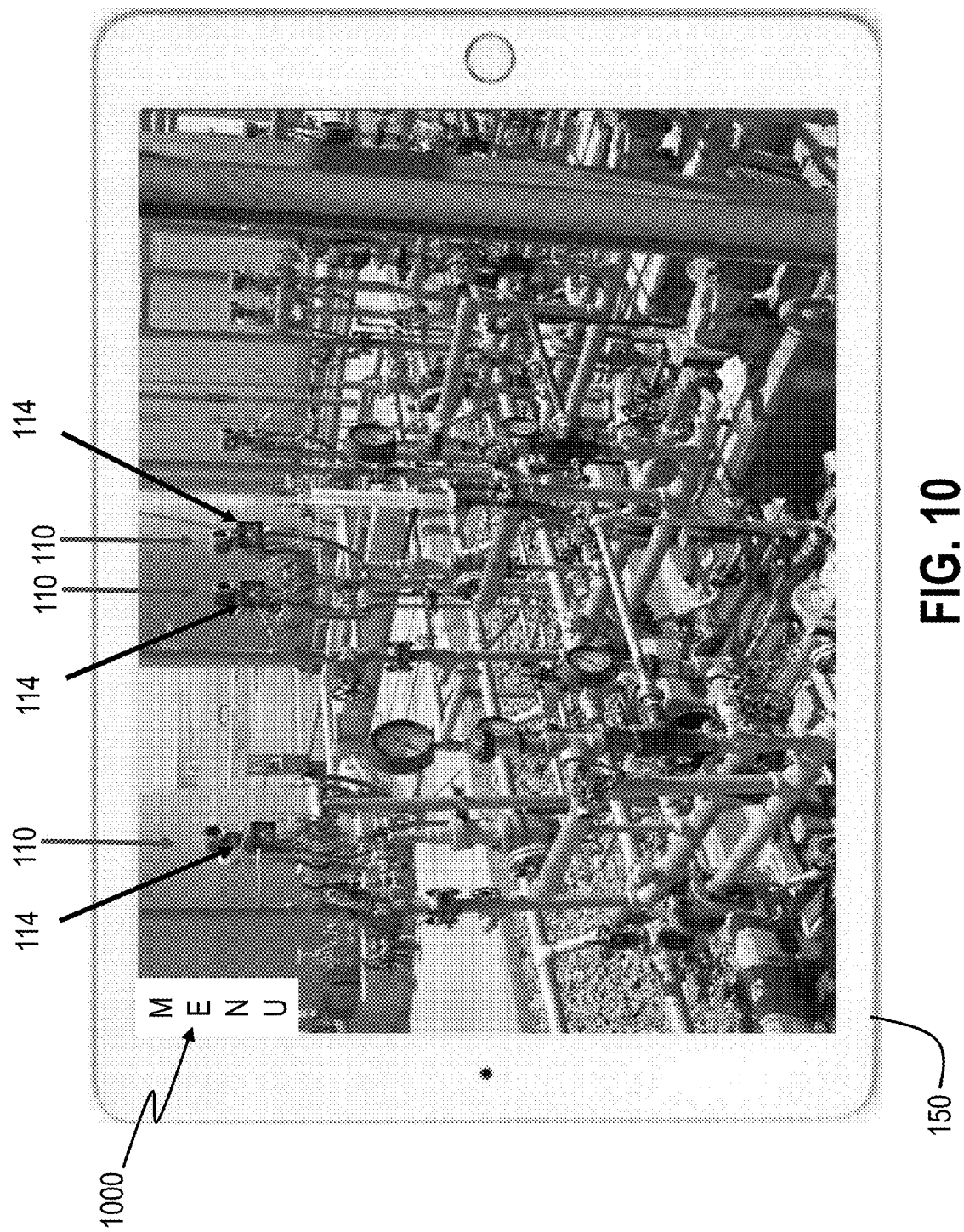
FIGS. 10 and 11 illustrate an example of an AR implementation on a user device, in accordance with an example embodiment of the present disclosure.
Figure 11:
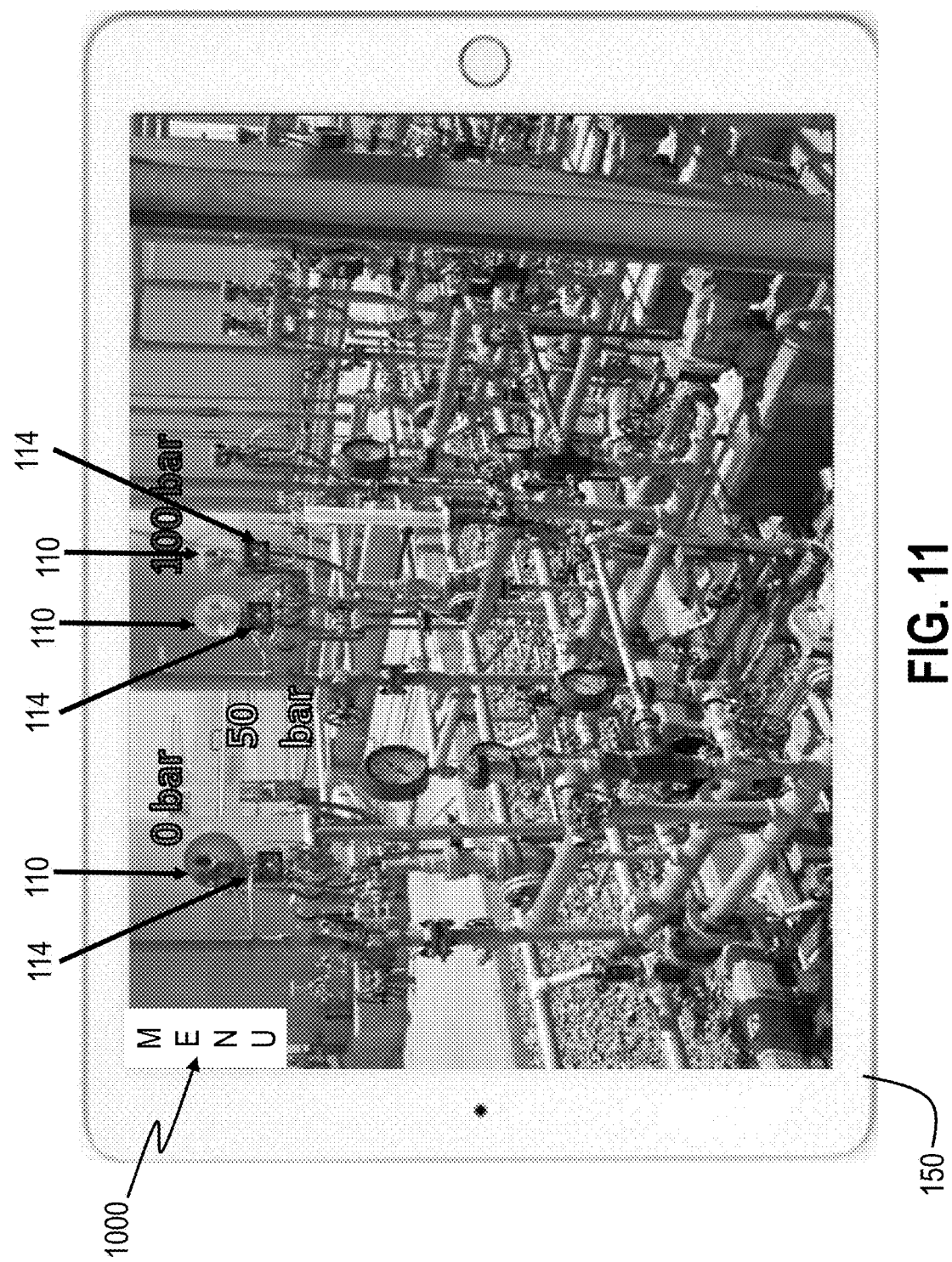

FIGS. 10 and 11 illustrate an example of an AR implementation displayed on a display device of the user device, such as the user device 150, in accordance with an example embodiment of the present disclosure. As shown in FIG. 10, the user device 150 captures and displays live images (e.g., from live image feed or live video feed) of a real world area captured by the image sensing device 330. In this example, the image is of an area of an industrial facility, with a plurality of sensor systems 110 and associated beacons 114. The sensor system 110 includes, for example, pressure sensor(s) for monitoring a pressure in various pipes or piping in the area of the industrial facility, which has been captured by the image sensing device 330. As shown in FIG. 11, real time sensor data, such as a pressure measurement (e.g., 0 bar, 50 bar and 100 bar) from the sensor systems 110 is overlaid with respect to a corresponding sensor system 110 or component thereof. In this example, the real time sensor data is shown in text, but can instead be shown graphically or visually differentiated to show a range or condition (e.g., high pressure, moderate pressure, low pressure, normal pressure, abnormal pressure, etc.). A different visual characteristic can be used to differentiate the information associated with each sensor system displayed in the image on the user device 150. For example, the real time sensor data can be color-coded (e.g., red, orange, yellow, green, blue, indigo and violet or a combination thereof) and/or outlined differently to differentiate the sensor data for a corresponding sensor system or the nature or severity associated with the sensor data (e.g., high pressure measurement shows red, low pressure shows blue, etc.). Furthermore, in this example, the communication devices 116 (e.g., transmitters) of the sensor systems 110 are color-coded according to the corresponding real time sensor data (e.g., pressure measurements or readings).

It should be understood that the image sensing device 330 or components associated therewith (e.g., electronic or mechanical zoom) can be controlled to adjust the field of view of the area to be captured, e.g., to focus on a larger or smaller group of sensor systems 110 or area, or a specific sensor system 110 or area.

A menu of options is also displayable and provides user-selectable operations to be performed on the user device 150. The menu can be the menu 1000 or include the menu of options in the menu 1000, such as previously discussed with reference to FIG. 10.

Figure 12:
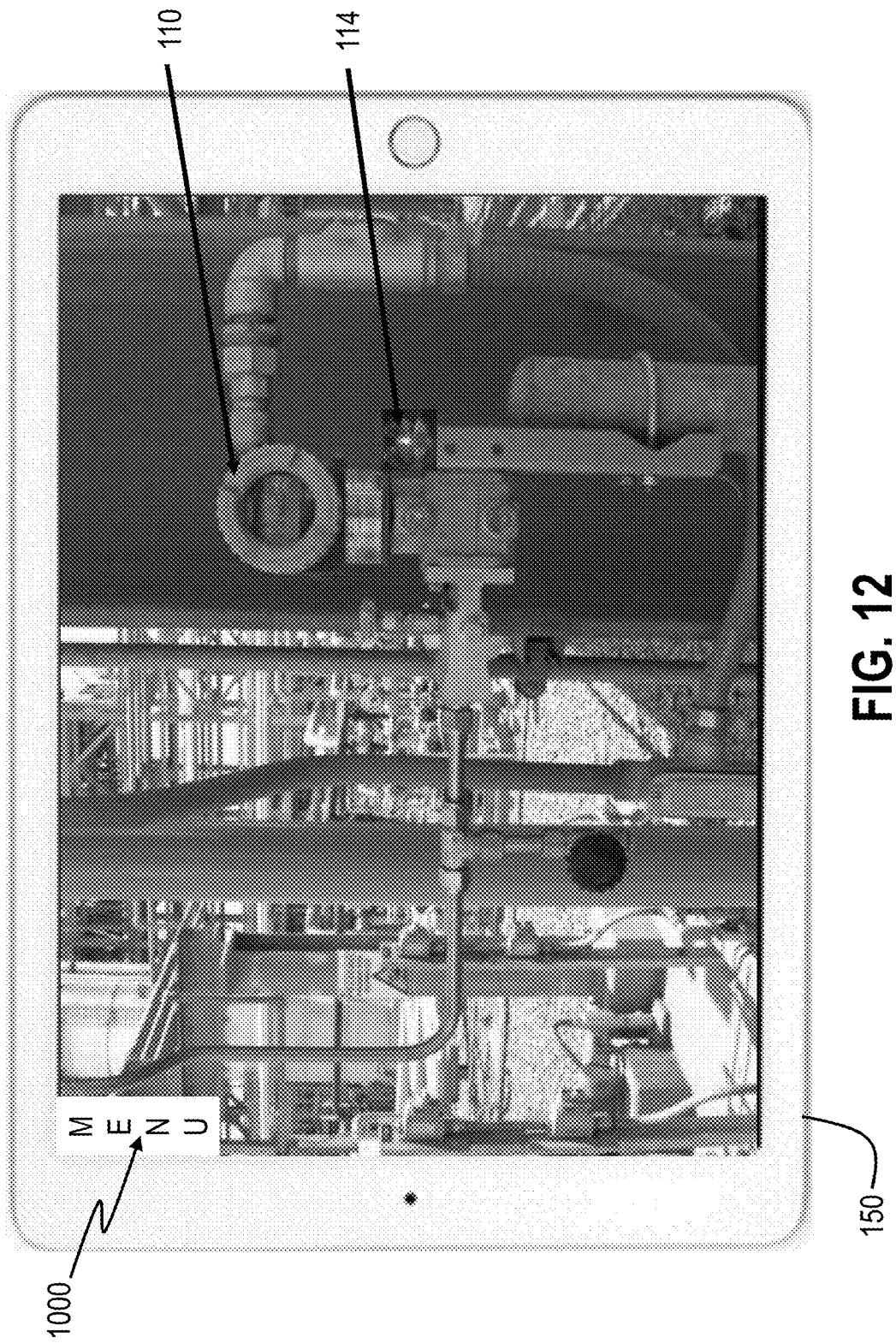
FIGS. 12, 13, 14 and 15 illustrate an example of an AR implementation on a user device, in accordance with a further example embodiment of the present disclosure.
Figure 13:
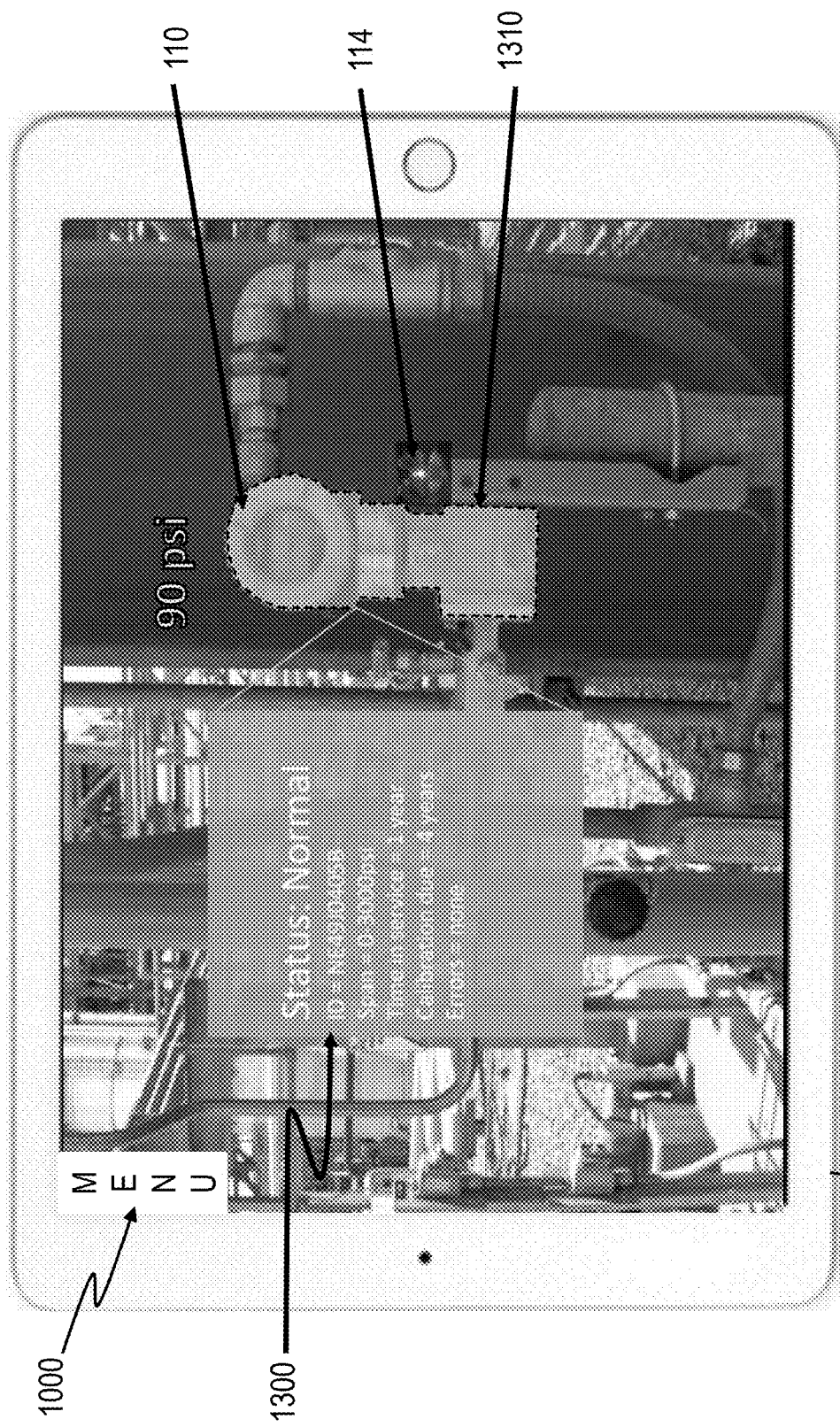

FIGS. 12, 13, 14 and 15 illustrate another example of an AR implementation displayed on a display device of the user device, such as the user device 150, in accordance with a further example embodiment of the present disclosure. As shown in FIG. 12, the user device 150 displays a specific sensor system 110 or its components such as its beacon 114 and communication device 116 (e.g., transmitter). In this example, the sensor system 110 includes pressure sensor(s) but can include other types of sensors depending on the application or the conditions to be monitored. The user device 150 captures images of an area including a pattern outputted by the beacon 114, and interprets the pattern to obtain information including real time sensor data (along with other data related to the sensor system). The information can be one or more of the sensor data, such as described in the data format 900, with reference to FIG. 9. As shown in FIG. 13, the user device 150 displays the information overlaid on the captured images in relations to the corresponding sensor system 110 or components thereof, such as using a text box 1300 or the like. In this example, the displayed overlaid information can include the following: Status: Normal; ID=NE49J0405B; Span=0-3000 psi; Time in service=1 year; Calibration due=4 years; and Errors=none. The real time sensor data, such as pressure measurement (e.g., 90 psi), is also overlaid relative to the sensor system 110 or components thereof. In this example, the sensor system 110 or components thereof are highlighted (e.g., outlined and color-coded) as shown by reference 1310, and the sensor system data is displayed relative to the sensor system 110 on the captured images.

Figure 14:
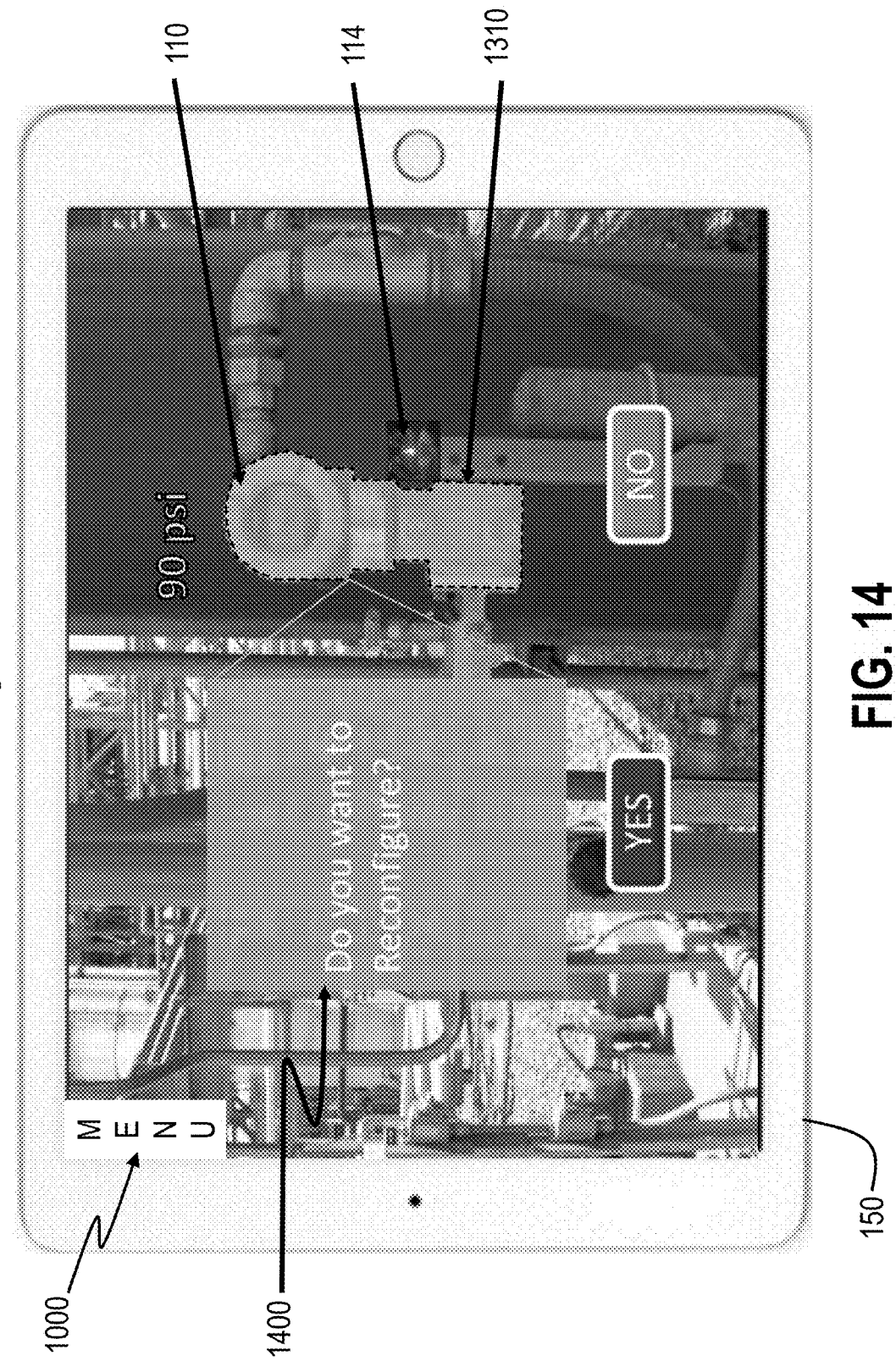

As shown in FIG. 14, through the AR display, the user can also reconfigure the sensor system 110 or components thereof using the user device 150, such as shown at reference 1400. For example, the user can select a reconfigure option using the menu 1000 or by selecting the sensor system 110 to obtain selectable menu options. In this operation mode, the user device 150 can communicate directly with the sensor system 110 via the communication device 360, and initiate operations on the sensor system 110, such as to reconfigure or to reset (or to initiate other actions on) the sensor system 110 or components thereof.

Figure 15:
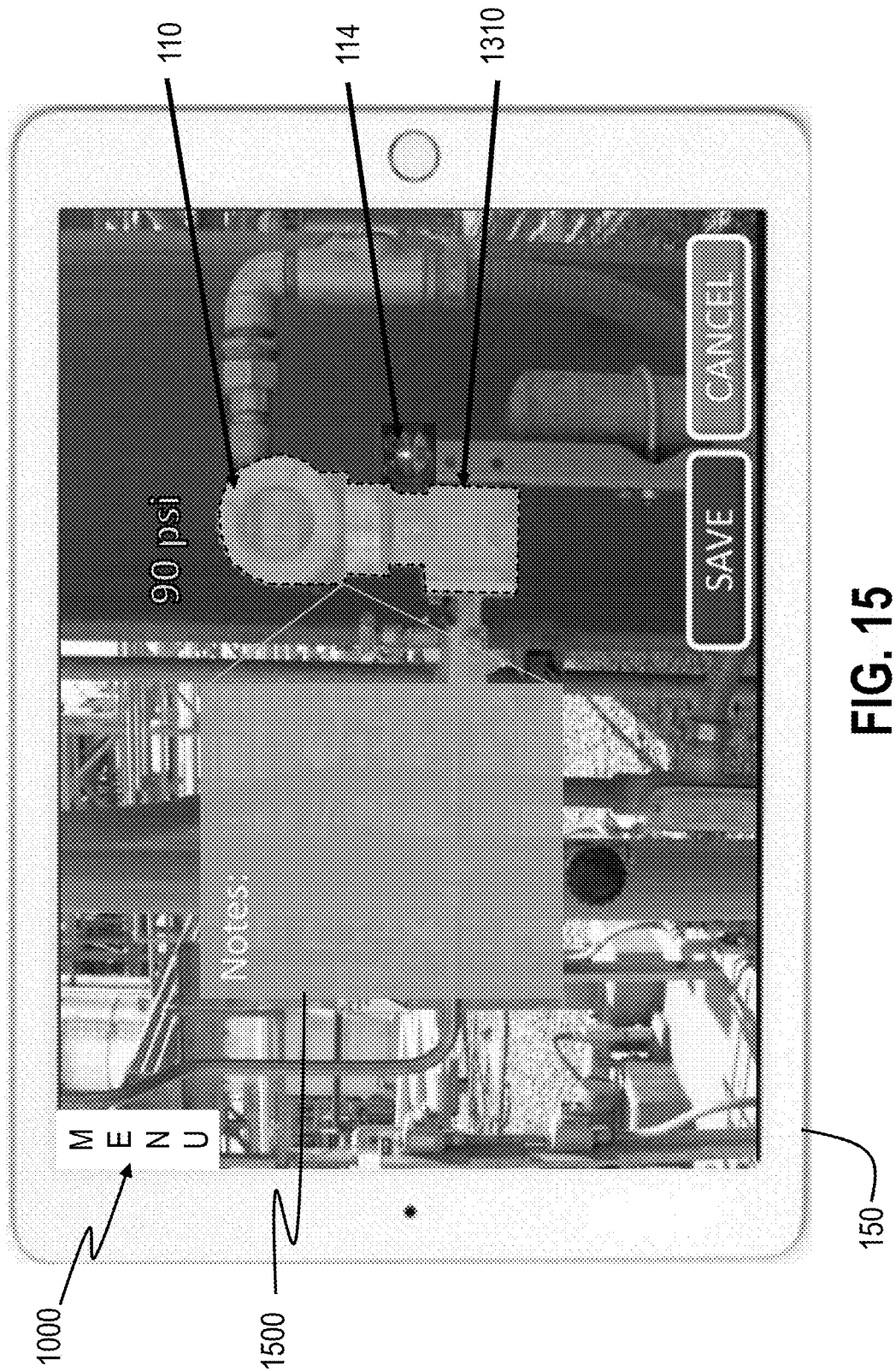

As shown in FIG. 15, the user can also take a still image (e.g., a picture) of an overlaid image from a live video or image feed as well as take notes about the status of the sensor system 110 or components thereof. The notes can be inputted via a graphical input element or textbox, such as shown by reference 1500. This information can then be saved in the memory 350 of the user device 150 and/or transmitted to the management system 180 for further evaluation.

It should be understood that devices, systems and methods described above are provided as examples. The various devices or systems, such as in FIGS. 1-3, can include processor(s), memory, communication devices and other components to provide or control operations of the monitoring system 100. The subsystem of the processor and beacon and other components can be retrofitted to existing sensor(s) or sensor system(s), such as a pressure sensor with a transmitter, to implement the functions and features described herein.

The devices and systems, described herein, can also incorporate different or additional functionality. For example, the augmentation of a beacon color (e.g., wavelength) on the image could indicate additional information, such as relating to the sensor system data; communication of information (as described herein) to a device type manager (DTM) can be provided; video surveillance cameras can also be used to capture images of an area including any outputted patterns by sensor system for use in the AR display described herein; a drone can be programmed with a camera to fly to the sensor system or components thereof (e.g., transmitters), read the beacons from the air, and report back in a similar fashion as the user device examples described herein; the beacon pattern can be encrypted or protected, e.g., with a secure visible light-based communication code, to protect the information conveyed through the pattern outputted by a beacon; visible light communication (e.g., VLC or Li-Fi) can be used to transmit greater amounts of information; instead of a light-based beacon, a rotating wheel or other visibly alterable mechanical beacon can be used.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions of the script syntax for the various sections of a script file or script for a test scenario, directives, command-line switches, expressions, objects, attributes, thread names, file names, directory names and other naming conventions used herein are provided as examples, and can be given a different name or label.

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

A processor(s) as described herein can be a processing system, which can include one or more processors, such as CPU, GPU, controller, dedicated circuitry or other processing unit, which controls the operations of the devices or systems, described herein. Memory/storage devices can include, but are not limited to, disks, solid state drives, optical disks, removable memory devices such as smart cards, SIMs, WIMs, semiconductor memories such as RAM, ROM, PROMS, etc. Transmitting mediums or networks include, but are not limited to, transmission via wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, and other stationary or mobile network systems/communication links.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A system for accessing and displaying real time information from a sensor system in an augmented reality environment, the system comprising:
    an image sensing device for capturing images of an area including a beacon for a sensor system and a pattern outputted by the beacon, the pattern corresponding to information including real time sensor data of one or more conditions monitored by the sensor system in the area;
    a display device for displaying the images captured by the image sensing device;
    a processor configured to:
        identify the pattern from the images captured by the image sensing device;
        translate the pattern to obtain the sensor data;
        overlay the sensor data over the captured images in relations to the beacon or sensor system in the captured images; and
        display via the display device the overlaid images with the sensor data,
        wherein the sensor system or a component thereof in the displayed overlaid images is highlighted, outlined or color-coded and displayed relative to the sensor data.

2. The augmented reality system of claim 1, wherein the captured images comprises a live image feed or live video feed.

3. The augmented reality system of claim 1, wherein the pattern comprises an infrared pattern outputted by the beacon.

4. The augmented reality system of claim 1, wherein the pattern comprises a visible pattern discernable in a visible light spectrum and outputted by the beacon.

5. The augmented reality system of claim 1, further comprising
    a communication device to conduct communication across a network, wherein the sensor data is transmitted to a remote management system.

6. The augmented reality system of claim 1, comprising a mobile device which includes the image sensing device, the display device, the memory and the processor.

7. The augmented reality system of claim 1, further comprising:
    the sensor system including:
        a sensor to monitor one or more conditions,
        the beacon, and
        a sensor system processor configured to control the beacon to output the pattern.

8. The augmented reality system of claim 1, wherein the sensor data is a sensor measurement taken by a sensor of the sensor system.

9. The augmented reality system of claim 1, wherein the area in the images includes a plurality of beacons each outputting a separate pattern corresponding to information including real time sensor data for a corresponding sensor system in the area, the processor being configured to identify each of the separate patterns, to translate each of the separate patterns to obtain respective sensor data, to overlay sensor data for each sensor system over the captured images in relations to the corresponding beacon or sensor system in the captured images, and to display via the display device the overlaid images with the sensor data for each of the different sensor systems.

10. The augmented reality system of claim 1, wherein the sensor data includes an identifier for a sensor of the sensor system, the processor being configured to request and receive sensor information for the sensor identified by the identifier from a remote management system,
    wherein the processor overlays the sensor information from the remote management system over the captured images in relations to the beacon or sensor system in the captured images, and displays via the display device the overlaid images with the sensor information from the remote management system.

11. The augmented reality system of claim 1, wherein the beacon is a mechanical beacon configured to output the pattern by controlling a movement of the beacon or a part thereof to produce a visible pattern.

12. The augmented reality system of claim 1, wherein the sensor system or a component thereof is outlined and color-coded in the overlaid images, and the displayed sensor data is also color-coded to match a color of the sensor system or a component thereof.

13. A method of accessing and displaying real time information from a sensor system in an augmented reality environment, the method comprising:
   capturing images of an area including a beacon for a sensor system and a pattern outputted by the beacon, the pattern corresponding to information including real time sensor data of one or more conditions monitored by the sensor system in the area;
   identifying the pattern from the images captured by the image sensing device;
   translating the pattern to obtain the sensor data;
   overlaying the sensor data over the captured images in relations to the beacon or sensor system in the captured images; and
   displaying the overlaid images with the sensor data on a display device,
   wherein the sensor system or a component thereof in the displayed overlaid images is highlighted, outlined or color-coded and displayed relative to the sensor data.

14. The method of claim 13, wherein the captured images comprises a live image feed or live video feed.

15. The method of claim 13, wherein the pattern comprises an infrared pattern outputted by the beacon.

16. The method of claim 13, wherein the pattern comprises a visible pattern discernable in a visible light spectrum and outputted by the beacon.

17. The method of claim 13, further comprising:
   transmitting the sensor data to a remote management system.

18. The method of claim 13, further comprising:
   monitoring one or more conditions on the sensor system; and
   outputting the pattern using the beacon.

19. The method of claim 13, further comprising:
   detecting an existence of the beacon of the sensor system in the images.

20. The method of claim 13, wherein the sensor data is a sensor measurement taken by a sensor of the sensor system.

21. The method of claim 13, wherein the area in the images includes a plurality of beacons each outputting a separate pattern corresponding to information including real time sensor data for a corresponding sensor system in the area, the processor being configured to identify each of the separate patterns, to translate each of the separate patterns to obtain respective sensor data, to overlay sensor data for each sensor system over the captured images in relations to the corresponding beacon or sensor system in the captured images, and to display via the display device the overlaid images with the sensor data for each of the different sensor systems.

22. The method of claim 13, wherein the sensor data includes an identifier for a sensor of the sensor system, the method further comprising: requesting and receiving sensor information for the sensor identified by the identifier from a remote management system,
   wherein the sensor information from the remote management system is overlaid over the captured images in relations to the beacon or sensor system in the captured images, and the overlaid images with the sensor information from the remote management system are displayed on the display device.

23. A non-transitory computer readable medium storing executable code which, when executed by one or more processors, implements a method of accessing and displaying real time information from a sensor system in an augmented reality environment, the method comprising:
   capturing images of an area including a beacon for a sensor system and a pattern outputted by the beacon, the pattern corresponding to information including real time sensor data of one or more conditions monitored by the sensor system in the area;
   identifying the pattern from the images captured by the image sensing device;
   translating the pattern to obtain the sensor data;
   overlaying the sensor data over the captured images in relations to the beacon or sensor system in the captured images; and
   displaying the overlaid images with the sensor data,
   wherein the sensor system or a component thereof in the displayed overlaid images is highlighted, outlined or color-coded and displayed relative to the sensor data.

24. An augmented reality beacon system for conveying sensor data from a sensor to a user device with an augmented reality display, the beacon system comprising:
   a beacon for generating a pattern to be captured by an image sensing device of the user device; and
   a processor configured to:
      receive real-time sensor data from the sensor; and
      control the beacon to output a pattern corresponding to the sensor-related data,
   wherein the beacon is a mechanical beacon configured to output the pattern by controlling a movement of the beacon or a part thereof to produce a visible pattern.

* * * * *